Jan. 11, 1949.   R. J. PAGLIUSO   2,458,872
PANORAMIC TILTING TRIPOD HEAD
Filed April 22, 1946
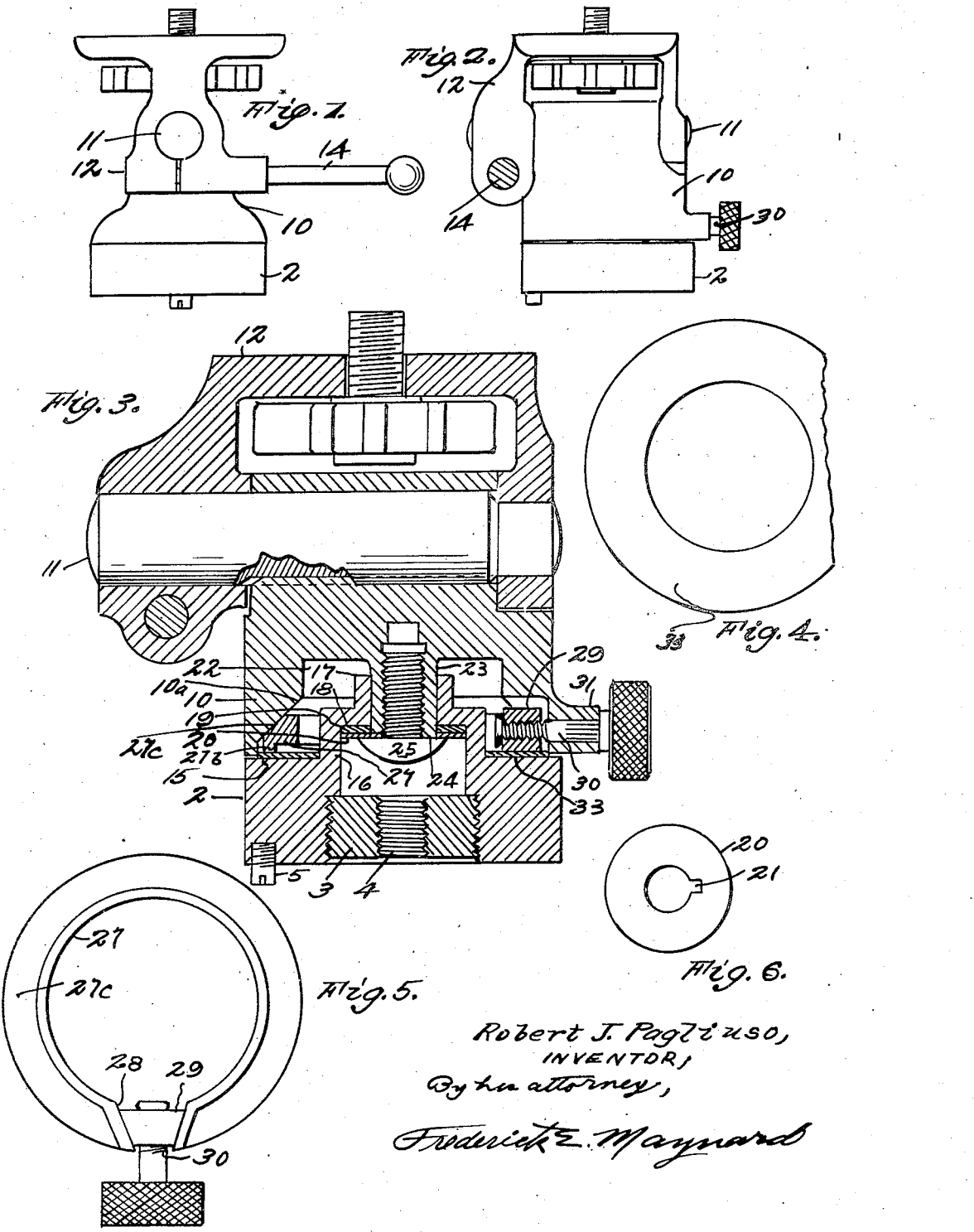
Robert J. Pagliuso,
INVENTOR,
By his attorney,
Frederick E. Maynard Patented Jan. 11, 1949

2,458,872

UNITED STATES PATENT OFFICE 2,458,872

PANORAMIC TILTING TRIPOD HEAD

Robert J. Pagliuso, Glendale, Calif.

Application April 22, 1946, Serial No. 663,980

4 Claims. (Cl. 248—183)

This invention is a panoramic, tilting head structure for camera tripods.

Panoramic, tripod heads have several objectional features such as lack of stability of the rotary head part on the base part; defective control of the swivelling action of the head part, and the need of too much attention of the operator of the camera during the making of pictures.

In this art it is very desirable that the operational parts should smoothly, accurately and easily function at all times and that the operator should have instant control of the degree of friction as between the swivelled parts.

Therefore it is an object of this invention to provide a panoramic tripod head structure which will overcome the above and other known objections and at the same time provide a highly efficient, compact, substantial, long-life and not too expensive tripod swivel head structure.

A further object is to provide a panoramic tripod head of but few and very simple but highly practical elements in the head assembly.

An additional object of the invention is to provide a master control device which embodies the several functions of well stabilizing the rotary head part; of uniformly exerting a swivelling friction on the rotary head part, and of forming an effective lock to hold the head part rigidly with and as to the base part, at the will of the operator.

Noticeably, an object of the invention is to provide a friction or braking device which distributes the needed friction by way of a large and peripheral zone of contact onto a complementary area of the relatively stationary base part.

The invention resides in certain features of advancements in this art as set forth in the ensuing disclosure and having, with the above, additional objects and advantages as hereinafter developed, and whose constructions, combinations and sub-combinations, and details of means, and the manner of operation will be made manifest in the following description of the herewith illustrative embodiment; it being understood that modifications, variations, and adaptations may be resorted to within the scope, spirit and principles of the invention as it is more directly claimed in conclusion hereof.

Figure 1 is an elevation looking toward the side of the camera tilting block and its operating lever.

Figure 2 is an elevation of the unit looking toward the right side, as to Fig. 1; the lever being in cross-section.

Figure 3 is a vertical section on the axis of the head swivel.

Figure 4 is a broken-away plan of the main friction washer.

Figure 5 is a plan of a lock-washer for the rotary head part.

Figure 6 is a plan of the isolated friction, locking ring.

The assembly includes a preferably cylindrical base 2 here having a central, bottom plug 3 threaded at 4 for attachment of a desired tripod top or table (not shown); a head base locating screw 5 being provided in the bottom of the base 2.

Above and mounted on the base 2 there is a rotative head body 10 having a rigid, transverse trunnion pin 11 on which is tiltable, on a horizontal axis, a camera carrying block 12, having a central, rotative screw to affix the camera (not shown). The block 12 is tiltable by means of an extended handle or lever 14.

Means are provided to rotatively connect the head part 10 to the stationary base part 2 and affix these parts against relative axial shift and effect a snug hitch of the parts one to the other without objectionable loose play and rattle in the event that the main friction control device of the assembly is inactive.

The base 2 has a wide and flat transverse shoulder 15 from which projects upward a central hollow hub 16 and upwardly from the top of this hub extends a reduced boss 17 whose inner end presents an annular, flat face 18 on which lies a friction washer 19 which is engaged by a subjacent hard, rotative washer 20 which has an internal key notch 21; Fig. 4.

The bottom face of the rotative head 10 is deeply pocketed at 22 and has a central, pendent hub 23 telescoping into the boss 17 and having an end key 24 projecting into the notch 21 of the adjacent washer 20. A fastening screw 25 pierces the washers 19 and 20 and screws into the head hub 23. The purpose of this screw 25 is to firmly pull the rotary head 10 toward the base 2 and crowd the hard washer 20 onto the softer friction washer 19 on which the keyed washer 20 turns with any rotation of the head part 10.

A distinctive feature of this invention resides in the means which controls the degree of friction which is to be had as between the stationary base 2 and the panoramic head part 10, and also constitutes a head stabilizer, and a friction equalizer, as well. This means here includes a relatively large, resilient ring 27 split at one side and having the opposite ends at the split provided with outwardly convergent, flat faces 28 complementary to an interposed wedge 29, Fig. 6 having an actuating screw 30 which rotates in a lateral boss 31, Fig. 3, of the head 10. The screw 30 has a knurled thumb-cap whereby to draw the wedge 29 outward and therefore expand the split ring, or to loosen it for contraction, as desired.

The ring 27 surrounds and is well spaced from the base hub 16 and has a deep, upper, conical face 27c which is complementary to and constantly self-centers on an internal conic face 10c in the recessed bottom of the head part 10. The bottom face of the ring 27 has an annular marginal bearing zone 27b to engage and rotate on the near top face of the subjacent friction washer 33 disposed on the flat shoulder 15 of the base 2.

It will be seen that the conic ring 27 is of such size that even with but slight expansion effort by the wedge 29 the head 10 is effectively stabilized on the base 2. Further, when the ring 27 is expanded by any action of the wedge 29 the ring acts to self-center itself on the conic face 10c in the head, and by so doing very evenly distributes the generated friction, against rotation of the head, around the bearing surface engaged by the zone 27b of the head 10. The operator of the camera can readily adjust the degree of friction set up by the expansion ring 27 to suit his notions as to facility of camera swing for making a panorama view; and when so desired the head 10 can be solidly locked by drawing out on the wedge 29 very firmly and thus react on the ring 27 to rigidly jam it down on the packing ring-washer 33.

What is claimed is:

1. A panoramic tripod head including a base attachable to a tripod and supporting a flat, upwardly facing friction washer, a central boss upstanding in the washer from the base, a head body swivelled in said boss to turn on the plane of the said washer, a skirt extending downwardly from the head body and surrounding said boss and having a conical bore face, a radial screw projecting outwardly through the skirt, a split brake ring setting on said washer and fitting said bore face, and a nut on the inner end of the screw and having cam faces engaging and for expanding the ring against the bore face of the said body skirt.

2. The head of claim 1; the said body having a transverse, fixed trunnion pin above the said swivel boss, and a handle device mounted on the pin and by which the body is rotated on the base washer.

3. The head of claim 2; the trunnion pinion extending beyond one side of the head and opposite to the location of said radial screw so that either can be readily adjusted from its side of the body.

4. The head of claim 1; a fixed, transverse trunnion on the said body, a camera block journalled on the trunnion for vertical movement, and a handle attached to the block and whereby the block is tilted and the base is rotated on its swivel boss.

ROBERT J. PAGLIUSO.

REFERENCES CITED

The following references are of record in the file of this patent:

UNITED STATES PATENTS

| Number | Name | Date |
| --- | --- | --- |
| 1,015,250 | Roof | Jan. 16, 1912 |
| 1,948,055 | Thalhammer | Feb. 20, 1934 |
| 2,261,426 | Willcox | Nov. 4, 1941 |
| 2,429,803 | Cardona | Oct. 28, 1947 |

FOREIGN PATENTS

| Number | Country | Date |
| --- | --- | --- |
| 12,001 | Great Britain | 1890 |